US008650506B2

(12) United States Patent
Erickson et al.

(10) Patent No.: US 8,650,506 B2
(45) Date of Patent: Feb. 11, 2014

(54) USE OF EXTENSIBLE OBJECT DATA TO REPRESENT A FULLY QUALIFIED SOLUTION ORDER

(75) Inventors: Steven C. Erickson, Rochester, MN (US); Barry A. Kritt, Raleigh, NC (US); Thomas S. Mazzeo, Durham, NC (US); Kenneth W. Roberson, North Richland Hills, TX (US); William R. Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2731 days.

(21) Appl. No.: 11/271,540

(22) Filed: Nov. 10, 2005

(65) Prior Publication Data

US 2007/0103727 A1    May 10, 2007

(51) Int. Cl.
*G06F 3/048*    (2013.01)

(52) U.S. Cl.
USPC ........... 715/849; 715/786; 715/701; 715/828; 715/829; 715/830; 715/700; 715/704; 715/810; 715/835; 715/839; 715/832; 715/853; 715/854; 705/26.8

(58) Field of Classification Search
USPC ......... 715/786, 701, 828–830, 700, 704, 810, 715/835, 839, 832, 853–54
See application file for complete search history.

(56) References Cited

U.S. PATENT DOCUMENTS

| | | | |
|---|---|---|---|
| 6,611,725 B1 * | 8/2003 | Harrison et al. | 700/98 |
| 6,647,380 B1 * | 11/2003 | Yotsukura | 707/2 |
| 6,944,515 B2 * | 9/2005 | Nakajima et al. | 700/105 |
| 6,961,732 B2 * | 11/2005 | Hellemann et al. | 707/102 |
| 7,047,237 B2 * | 5/2006 | Suzuki et al. | 707/3 |
| 7,302,443 B2 * | 11/2007 | Nakajima et al. | 707/102 |
| 7,376,602 B2 * | 5/2008 | Zulpa et al. | 705/29 |
| 7,490,301 B2 * | 2/2009 | Fujieda | 715/853 |
| 2002/0026385 A1 * | 2/2002 | McCloskey et al. | 705/27 |
| 2003/0172349 A1 * | 9/2003 | Katayama et al. | 715/513 |
| 2003/0191688 A1 * | 10/2003 | Prince et al. | 705/14 |
| 2003/0212664 A1 | 11/2003 | Breining et al. | |
| 2004/0083209 A1 | 4/2004 | Shin | |
| 2004/0098384 A1 | 5/2004 | Min et al. | |
| 2004/0193627 A1 | 9/2004 | Matsuda | |
| 2005/0182690 A1 * | 8/2005 | Martineau et al. | 705/26 |
| 2007/0075128 A1 * | 4/2007 | Hall et al. | 235/376 |

OTHER PUBLICATIONS

Sung Ho Ha; Helping Online Customers Decide through Web Personalization; © 2002; IEEE; pp. 34-43.*
Chung et al., A two phase optimization technique for XML queries with multiple regular path expressions, The Journal of Systems and Software, vol. 64 ,2002, pp. 183-193.

* cited by examiner

*Primary Examiner* — Linh K Pham
(74) *Attorney, Agent, or Firm* — Yudell Isidore Ng Russell PLLC

(57) ABSTRACT

A method, system and computer-usable medium for generating a manufacturing-usable easily modifiable product order document is presented. An object collection of objects that describe features of components of a product is created. A view database that describes a logical relationship among components in the object collection is also created. A single document that includes the object collection and the view database is then generated. This single document can be updated according to technical requirements for a product being manufactured according to a product description created from the single document.

20 Claims, 15 Drawing Sheets

USE OF EXTENSIBLE OBJECT DATA TO REPRESENT A FULLY QUALIFIED SOLUTION ORDER

BACKGROUND OF THE INVENTION

1. Technical Field

The present invention relates in general to the field of computers, and in particular to computers used to generate product orders. Still more particularly, the present invention relates to a method and system for generating a product order using a novel document having separate hierarchy views and object collections.

2. Description of the Related Art

The concept of product fulfillment has typically been viewed as a process that begins with the taking of an order. In the field of information services, such an order usually consists of choosing already priced items from a catalog of hardware, software, and services. The order can then be committed and scheduled before it is passed to a source of supply for manufacturing and shipment. Before the item can be offered, it must be made "saleable" in the fulfillment system. The process to add an item to a catalog can take hours to weeks depending on the fulfillment system and the complexity of the offered item. Custom requirements must be pre-defined uniquely each time they are identified and this must occur before ordering can take place. For custom systems developed for a particular enterprise's hardware brands sales, this time lag or latency can vary between several days to a week or longer.

SUMMARY OF THE INVENTION

The present invention recognizes the need for a method, system and computer-usable medium for generating a manufacturing-usable easily modifiable product order document. An object collection of objects that describe features of components of a product is created. A view database that describes a logical relationship among components in the object collection is also created. A single document that includes the object collection and the view database is then generated. This single document can be updated according to technical requirements for a product being manufactured according to a product description created from the single document.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
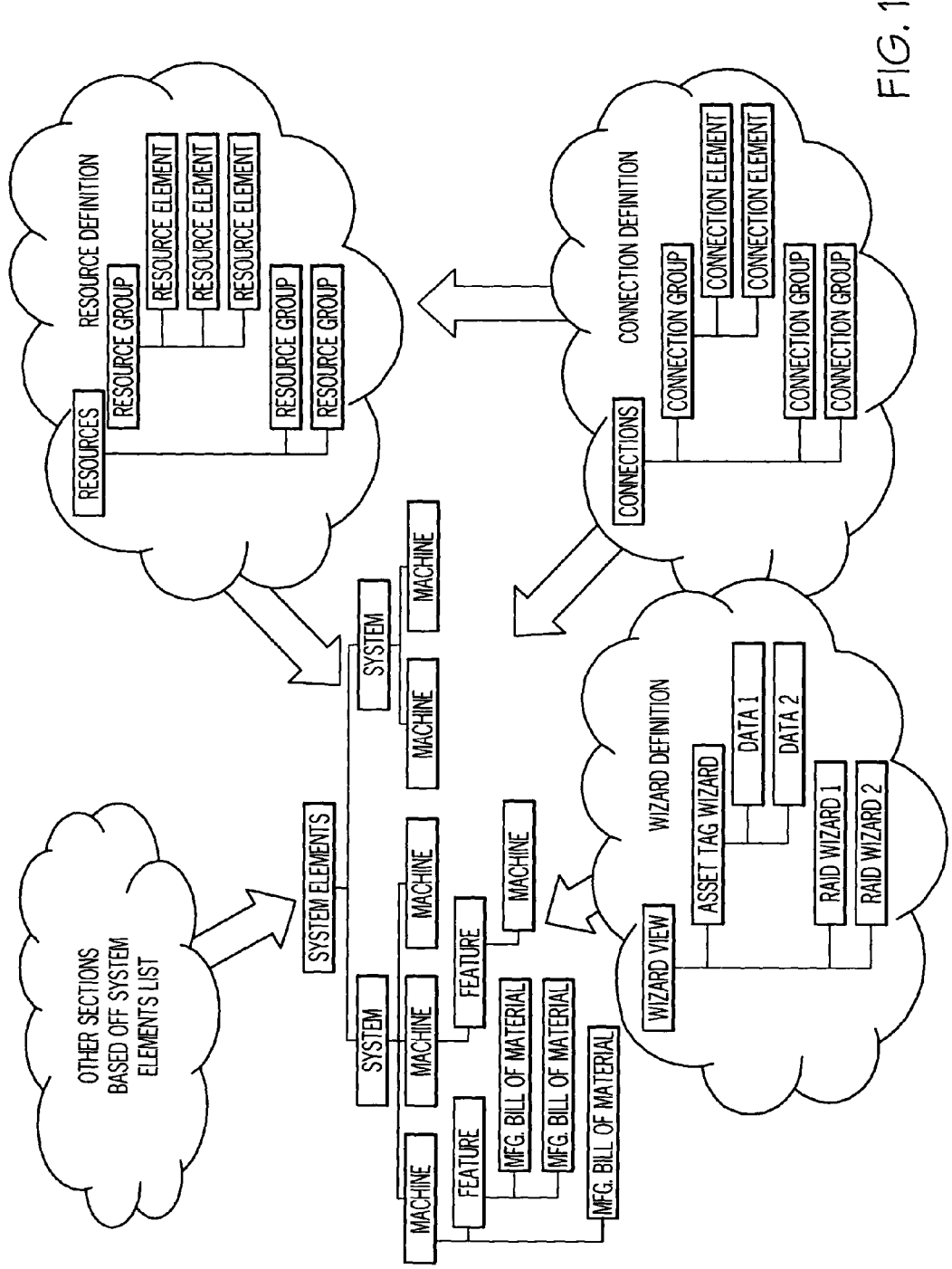
FIG. 1 depicts various definitions used to generate a sales order document.

The present invention utilizes the definition of a system in a structure called eXtensible Order Data (XOD). As implemented in a preferred embodiment herein, XOD is configured into a configurator and manufacturing strategy for use in Enterprise-to-Enterprise (E2E) Information Technology (IT)—from configurator capabilities, to the WEB commerce engine, and to the IT Pipes in back-office fulfillment systems. Representing and Passing Complex Configured Solutions to Manufacturing With the dynamic abilities that Wizards and On Demand processing have opened up for the configuration space, current methods of specification and storage formats must evolve. Historically, configurations created by users were represented in formats that are tied specifically to the technology used in the rules processing engine. From these proprietary structures, they were converted numerous times to pipe or application specific formats. This caused the following problems to arise:

Each time the document is converted; information about what the user had selected is lost.

Some of the standard formats are ridged in nature. Modifications to the record layouts and passing addition information are problematic at best. A number of applications have resorted to passing information on comment records to send information along.

Current existing structures for storing configurations or representing them are flat or fixed depth. While this works fine for simple, single system orders, it fails in nested or clustered environment orders. In these configurations, you have the concept of machines with in machines. Hacks to the current structures and sub-optimal product announcements (i.e. announcing part number to represent rack and drawer locations) further complicate the matter.

When an outside consultant moves from one rules processing platform to another, configurations created in previous versions do not migrate well to new rules engine. Only when configurations are exported to a format can they be restored into the new configurator. Due to limitations with these formats as stated above, data is lost in the migration process.

Due to the transferring of order details from application to application, product validation rules can change without the new rules being applied. If problem is found in a specific configuration of parts, those rules can be added to the configurator. The predicament comes into play on orders generated with the old rules. There is a gap of old orders that will fail or have to be rejected in manufacturing.

To negate these problems and support the wizard concept, a new standardized configuration storage mechanism is presented. The new format, Configuration State Data (CSD), will be used in an Enterprise Configurator (EC). An extension of that format, eXtensible Object Data (XOD) will be generated on demand by EC for manufacturing purposes.

Configuration State Data (CSD)

Configuration State Data (CSD) is the new strategic methodology for storing configurations. This format is XML schema based. The design of the CSD is to capture both sales side (i.e. product selections, customizations . . . ) and manufacturing side (i.e. connections, placement . . . ). The following are design points of a preferred embodiment of this mechanism.

The representation of products and hierarchy are done via a recursive schema definition. This allows for an actual representation of the physical construction of the configuration. This allows for an infinite depth of nesting and clustering to be represented.

A new central repository for the configurations based on the CSD is presented. The central location allows for information to be passed along more gracefully than previously able. Having a central location allows the outside consultant to do the following:
1. Ensures that any validation/data pulled off of an order is validated using the most recent product configuration rules.
2. A unique configuration ID will be assigned to all configurations. This allows for a minimal amount of information (i.e. the configuration ID) to be passed around between the applications thus removing the capacity for loss of data. Requests for data/validation/outputs are made to the central repository thus ensuring that the original selections are used.
3. Applications can request information on any configuration stored in the repository in an on demand fashion. As stated before all requests can be validated against rule set.
4. With the central repository, the outside consultant can perform data mining operations to forecast product configuration trends. Previously, configurations were stored either in local repositories, user VM disks, web portals, or local file systems. This made it only possible for the consultant to only study trends in orders that were placed. With the central repository, metrics can be gathered not only on what is ordered, but what customers viewed in "what if" scenarios and how many cycles of edit-change-review happen before an order is placed.

The presently presented storage format is XML schema based. This allows for the data to be extended, meeting the dynamically changing product announcement structures. Using an XML based output also allows for lower cost development through the use schema binding tools (like JAXB or Castor) and transformations using XSLT processors. All previous configurator storage mechanisms have used proprietary formats that required custom code to interpret.

Each selection made in the configurator will be assigned a unique configuration element ID. This is used to help keep track of individual instances of the same product/selection that is present multiple times in the configuration. This ID is also used to track connection, placement, and other types of relationships needed for the configuration space. This ID can optionally be used by wizards to form a bond to specific regions in a configuration. This bond allows the configurator to re-invoke the wizard if the products/selections are changed.

The format also provides the mechanism for self-defining structures, like wizards, to store their customization information.

eXtensible Order Data (XOD)

The concept of XOD is a radical departure from how manufacturing information has been historically captured. In times past information about a configuration was captured in a structure focused on one aspect of the configuration (i.e. physical creation). Different documents would contain supplemental data about the order (i.e. clustering, custom software setup/installation, asset tagging . . . ). Some of these documents were machine readable and others were only human readable. Special secondary applications had to be built and maintained to process, validate, and build these additional documents.

XOD recognizes the need to reduce the number of custom application and the need for a more extendable way of capturing manufacturing information. To address these needs, the following concepts are incorporated into the XOD design:
1. The concept of multiple views stored in the same document. This model will be discussed in more detail following this list.
2. The document is described in an XML schema. Using and XML schema gives the ability to make use of existing tools to handle a validation, enforcement, and generation of the various individual manufacturing outputs (i.e. LPAR definitions, cabling and connections, wizard customizations . . . ). The use of XSLT processors and scripts will greatly simplify the development and maintenance of document transformations into those custom outputs. Tools such as XML binding using JAXB or castor can automate the parsing and validation of the XMLs generated.
3. The ability to dynamically define and contain configuration information that is not part of the normal product pipes. Examples of such information are Logical Partition (LPAR), Redundant Array of Independent Disks (RAID), Asset Tag, and other product definitions.
4. The reuse of the same set of rules for the sales side as well as the manufacturing side (i.e. a converged configurator) gives the following benefits: ensure consistent validation results; reduces product modeling costs; and reduces application costs and development times.

A central repository is used to capture the user's custom selections so that they are available for inclusion when manufacturing requests the generation of XOD. This concept is incorporated into the merging/converging of a sales and manufacturing configurator.

Trying to capture all of the possible information into one specific format has been difficult in the past due to limitations in existing technology and a drive to force the information into a single rigid style. The design of XOD accomplishes these goals by the use of a multiple-view method. The document is broken down into two sections, the system elements and views, as shown in FIG. 1.

The document contains a list of system elements. These elements are based off of the sales view for the systems. A system is defined as a machine with associated software, hardware, services, and peripheral devices. Each element (the system and its contained parts) in the list contains a unique XSD:ID so that it can be referenced by the views. This collection represents how the physical system was defined by the user at check out time. This information is augmented with a further break down of the SBOM items with direct MBOM children added.

Figure 2:
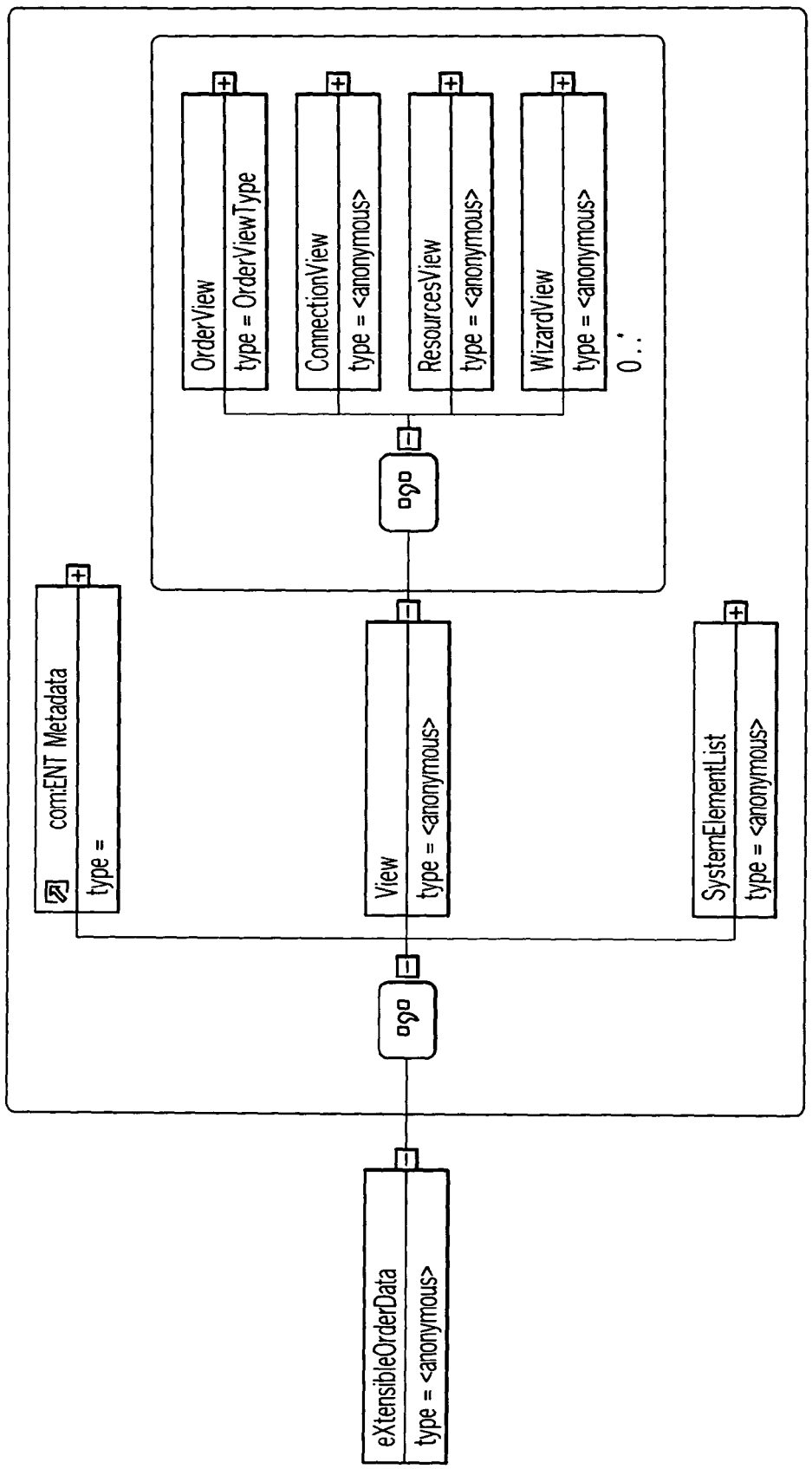
FIG. 2 illustrates an object hierarchy of an eXtensible Order Data (XOD) order document.

The views of the configuration are defined as a structure containing the additional information and hierarchy that references the main view by the use of XSD:IDREFs. These views are used to encapsulate specific data from the elements collection. As with the system elements, each of the view elements (and their children) will contain unique XSD:ID. These IDs can in turn be referenced by other derivative views to enhance their contained information. All wizards are contained in a self documenting style based on the WizardBase structure discussed along with the Configuration State Data, as shown in FIG. 2.

Manual Activities

When a customer order is scheduled to be built, a production order is generated to start the manufacturing process. This order will cause all of the required parts to be selected from inventory, and made available to a manufacturing assembler. The manufacturing assembler is typically an entry level employee with limited experience, and possibly limited ability to read instructions.

The job of a manufacturing assembler is difficult since they may work on many different machine types (and many variations within each machine type). In addition, they are expected to maintain a high throughput of machines, without making any errors.

As a result, it is crucial that information is available to the assemblers to clearly indicate (preferably using pictures instead of words) what they need to do to correctly assemble the unit. This includes information on placement of cards, cables, and other devices, as well as asset tag or other labeling requirements.

XOD is useful at this point in the process for several reasons. The XOD contains the information on device placement. The XOD is also in XML format and is easy to parse by manufacturing software tools, and can be used to give operators specific information on how to assemble a unit. This is much better than many of the alternative methods (such as procedure documents which may have general guidelines such as installation fill sequences for slots, bays, etc.)

XOD also has the ability to reference pictures and other graphics to aid the operator. For instance if there are three adapter cards which will be placed in some of the five available adapter card positions in a system, the XOD can contain a reference picture of the system along with coordinate information on locations. An operator can be guided on assembling the system by showing the picture with the correct adapter card location highlighted for each adapter card to be installed.

In a similar way, operators can be directed to correctly install all of the components of the system (such as processors, memory, DASD, adapter cards, cables, etc.) Note that the XOD is able to capture this information from the converged sales configurator, including any customer preferences, and make the information available in manufacturing.

Note also that all of the configuration information is contained in a structured and unambiguous manner. There is no need for additional data paths (such as a customer rep trying to convey free-form customer installation descriptions to manufacturing). Every order has information captured and shown to manufacturing operators in the same way.

Automated Activities

It is also necessary for manufacturing to perform numerous automated activities. These include verifying electronic components have been correctly assembled; configuration; updating firmware; testing; OS preload; etc. The automated activities are performed by programs running in manufacturing. These programs need to have clear, unambiguous, and structured input data to function correctly.

It is essential to verify that the system has been correctly assembled by the assembly operator. A test system can, by various methods, determine the parts that are in a unit, and many of the connection and configuration values. These can then be checked against the XOD data to ensure they were correctly built. Some examples of items that can be checked (for correct sizes/speeds/parameters) are adapter cards (such as PCI cards) and their locations; DASD devices (such as IDE/SCSI hard drives) their locations and cabling; memory devices and their locations; CPU devices and their locations; cache devices and their locations, etc.

Manufacturing is also required to configure systems as required by the customer order. A test system (such as IBM's X3) can automate many of these tasks by using XOD data. System preferences (such as boot sequence and power management options), RAID configurations, partitioning (such as system partitioning, DASD partitions, etc.), and OS loading and configuration can be performed using various programs and methods.

Manufacturing can also use XOD to trigger process steps such as automated firmware updates and specialized diagnostic testing. Since many devices are customer orderable options, there must be a mechanism to add manufacturing process content based on the ordered configuration. XOD allows a test system (such as IBM's X3) to dynamically generate a complete test sequence including the proper steps required based on all the installed devices. One advantage of using XOD to create a customized manufacturing process is that it is XML based. As a result, XML tools such as XSLT style sheets and XPATH can simplify the development of programs used to generate the customized manufacturing process required for each customer order.

Figure 3:
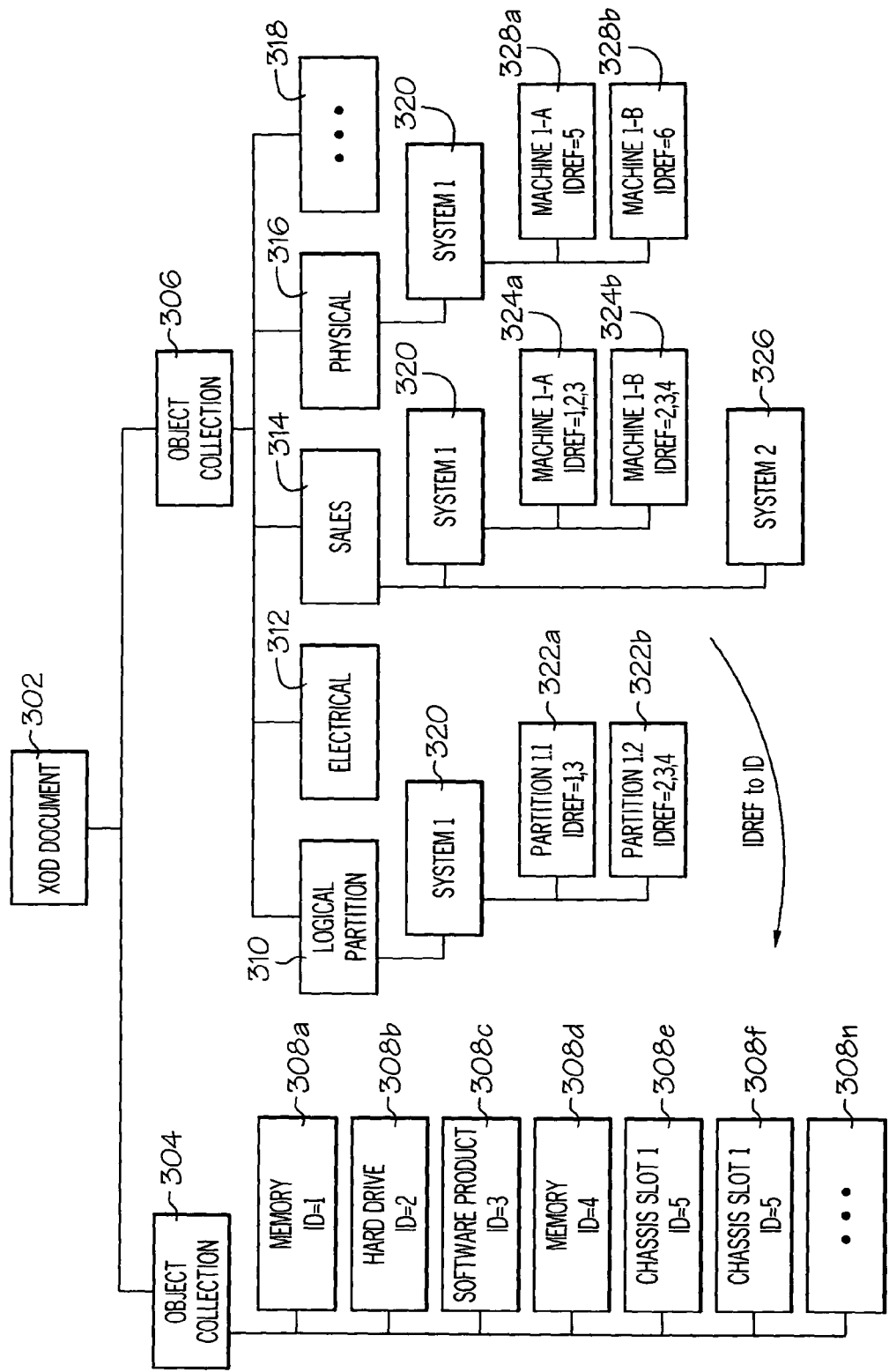
FIG. 3 depicts an XOD order document and its object collection and view/hierarchies object sub-units.

With reference now FIG. 3, there is depicted an XOD document 302 in accordance with the present invention. XOD document 302 includes an object collection 304 and views/hierarchies 306. Object collection 304 is a collection of objects 308*a-n*, which represent specific components of a product to be manufactured, such as a computer system 320. Views/hierarchies 306 shown a logical and/or physical relationship between components (described in objects 308*a-n*) in computer system 320. The views/hierarchies are from the viewpoint of different departments in a computer-building enterprise. For example, one department may be concerned with logical partitioning (LPAR), as shown in block 310, while another may be concerned with electrical components (block 312). The sales department (block 314) will usually have only a high-level concern as to what features are included in the computer system, while another department is concerned with the physical assembly (block 316) of the computer system, etc. (block 318). Note that the blocks 310, 312, and 316 may be part of engineering and/or manufacturing departments.

As depicted for exemplary purposes, when sales 314 built up an order sheet for a customer, computer system 320 was conceptualized as being two machines (1-*a* and 1-*b*), identified in FIG. 3 as 324*a* and 324*b*. Each component in each machine has an Identification Reference (IDREF), which corresponds to one or more Identifier (ID) in the objects 308*a-n*. For example, as shown in block 324*a*, Machine 1-*a* has the memory described by object 308*a*, the hard drive described by object 308*b*, and the software described by object 308*c*. Machine 1-*b* is similar to Machine 1-*a*, except that Machine 1-*b* has a different memory (described in object 308*d*) than Machine 1-*a*.

Sales 314 may or may not provide specific details as to how System 1 is built. Thus, when the engineering/manufacturing department begins assembling computer system 320 (System 1), it does so according to the instructions found in objects 328*a-b*, which are modified by any authorized department/person, including sales 314, the manufacturing department, or even a customer (if so authorized to access and modify XOD document 302). Thus, object 328*a* shows that the components of Machine 1-*a* are to be installed in chassis slot 1 of a blade server chassis, as described by the IDREF to ID function in which object 308*e* is selected for ID=5. Similarly, Machine 1-*b* is installed in chassis slot 2 of the blade server chassis.

Besides being physically segregated into different components, System 1 can be logically segregated into partitions, in which areas of memory, physical devices (such as hard drives), and software are dedicated for (preferably exclusive) use. For example, as shown in objects 322*a-b*, Partition 1.1 includes the memory (or area of memory) identified by object 308*a* and the software identified by object 308*c*. Similarly, Partition 1.2 uses the hard drive, software and memory identified by objects 308*b-d*.

Thus, as described in FIG. 3, object collection 304 does not care (or even "know about") views/hierarchies 306, but views/hierarchies 306 knows how to access object collection 304 (via the IDREF to ID process) to utilize/access/install each component.

XOD document 302 is further able to establish similar relationships for components found in System 2 (shown as object 326).

Figure 4:
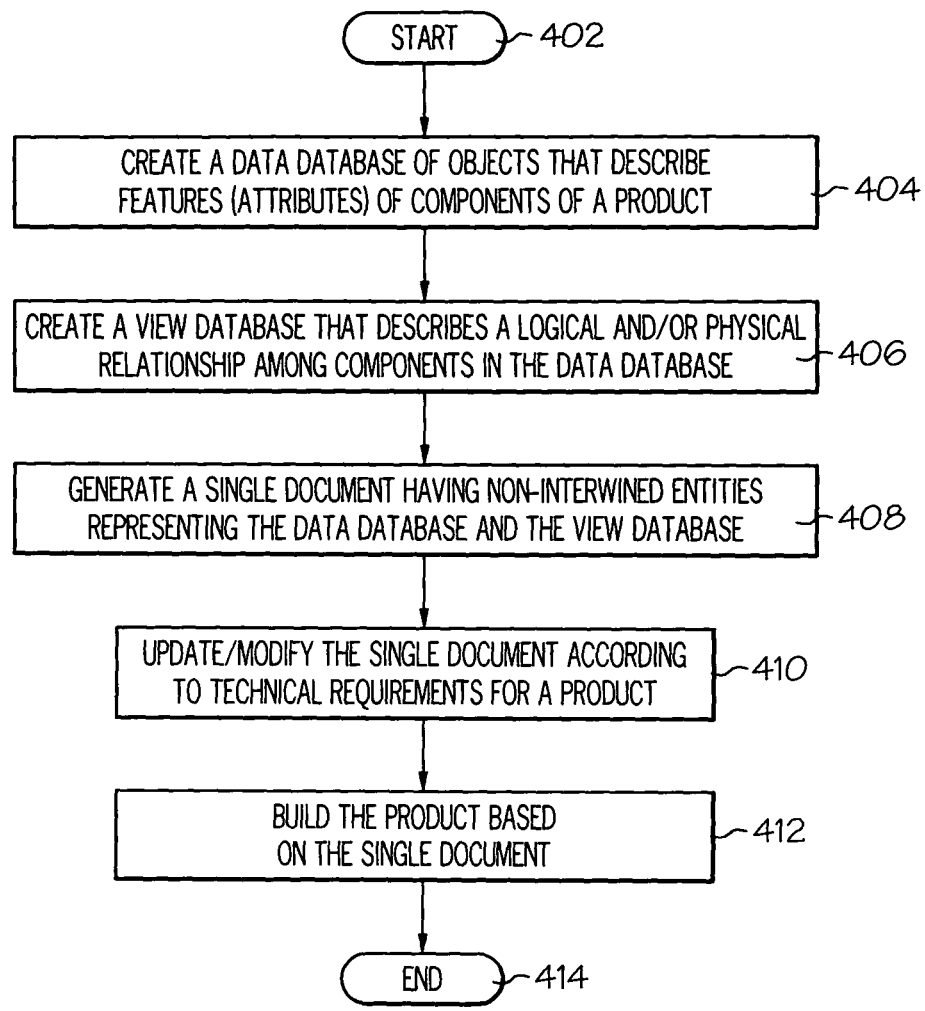
FIG. 4 is a flow chart of exemplary steps taken to create an XOD order document.

Referring now to FIG. 4, a flow-chart of exemplary steps taken and described above is presented. After initiator block 402, a data database (e.g., object collection 304 shown in FIG. 3) is created (block 404) that describes components of a product, such as a computer system. A view database (e.g., views/hierarchies 306 shown in FIG. 3) is also created (block 406), but in a manner such that the data and view databases are not directly intertwined, as described above. Using the view and data databases, a single document (e.g., XOD document shown in FIG. 3), is created (block 408). According to technical requirements and/or preference by the customer for the system being built, the single XOD document can be modified by any authorized entity (block 1410), preferably before the product is built. The product is then built according to the XOD document (block 412), and the process ends (terminator block 414).

Figure 5:
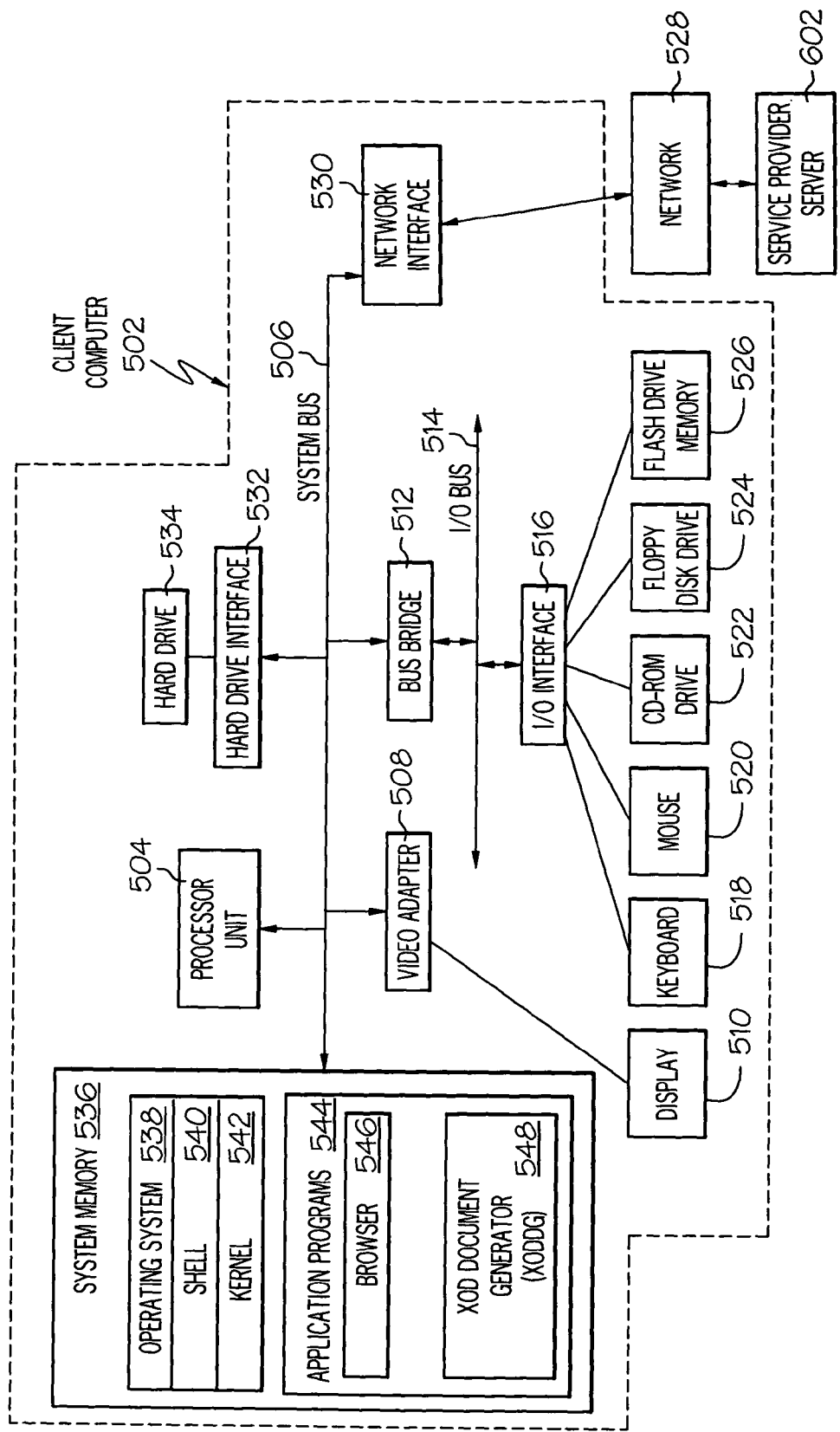
FIG. 5 illustrates an exemplary client computer that can be used at an enterprise-level for implementing the XOD order document.

With reference now to FIG. 5, there is depicted a block diagram of an exemplary client computer 502, in which the present invention may be utilized. Client computer 502 includes a processor unit 504 that is coupled to a system bus 506. A video adapter 508, which drives/supports a display 510, is also coupled to system bus 506. System bus 506 is coupled via a bus bridge 512 to a standard Input/Output (I/O) bus 514. An I/O interface 516 is coupled to standard I/O bus 514. I/O interface 516 affords communication with various I/O devices, including a keyboard 518, a mouse 520, and a Compact Disk—Read Only Memory (CD-ROM) drive 522. The format of the ports connected to I/0 interface 516 may be any known to those skilled in the art of computer architecture, including but not limited to Universal Serial Bus (USB) ports.

Client computer 502 is able to communicate with a service provider server 602 via a network 528 using a network interface 530, which is coupled to system bus 506. Preferably, network 528 is the Internet.

A hard drive interface 532 is also coupled to system bus 506. Hard drive interface 532 interfaces with a hard drive 534. In a preferred embodiment, hard drive 534 populates a system memory 536, which is also coupled to system bus 506. Data that populates system memory 536 includes client computer 502's operating system (OS) 538 and application programs 544.

OS 538 includes a shell 540, for providing transparent user access to resources such as application programs 544. Generally, shell 540 is a program that provides an interpreter and an interface between the user and the operating system. More specifically, shell 540 executes commands that are entered into a command line user interface or from a file. Thus, shell 540 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing.

As depicted, OS 538 also includes kernel 542, which includes lower levels of functionality for OS 538, including providing essential services required by other parts of OS 538 and application programs 544, including memory management, process and task management, disk management, and mouse and keyboard management.

Application programs 544 include a browser 546. Browser 546 includes program modules and instructions enabling a World Wide Web (WWW) client (i.e., client computer 502) to send and receive network messages to the Internet using HyperText Transfer Protocol (HTTP) messaging, thus enabling communication with service provider server 602.

Application programs 544 in client computer 502's system memory also include an XOD Documents Generator (XODDG) 548. XODDG 548 includes code for controlling creating an XOD document, such as XOD document 302 described in FIG. 3. In one embodiment, client computer 502 is able to download XODDG 548 from service provider server 602.

The hardware elements depicted in client computer 502 are not intended to be exhaustive, but rather are representative to highlight essential components required by the present invention. For instance, client computer 502 may include alternate memory storage devices such as floppy disk drives, magnetic cassettes, Digital Versatile Disks (DVDs), Bernoulli cartridges, and the like. These and other variations are intended to be within the spirit and scope of the present invention.

Figure 6:
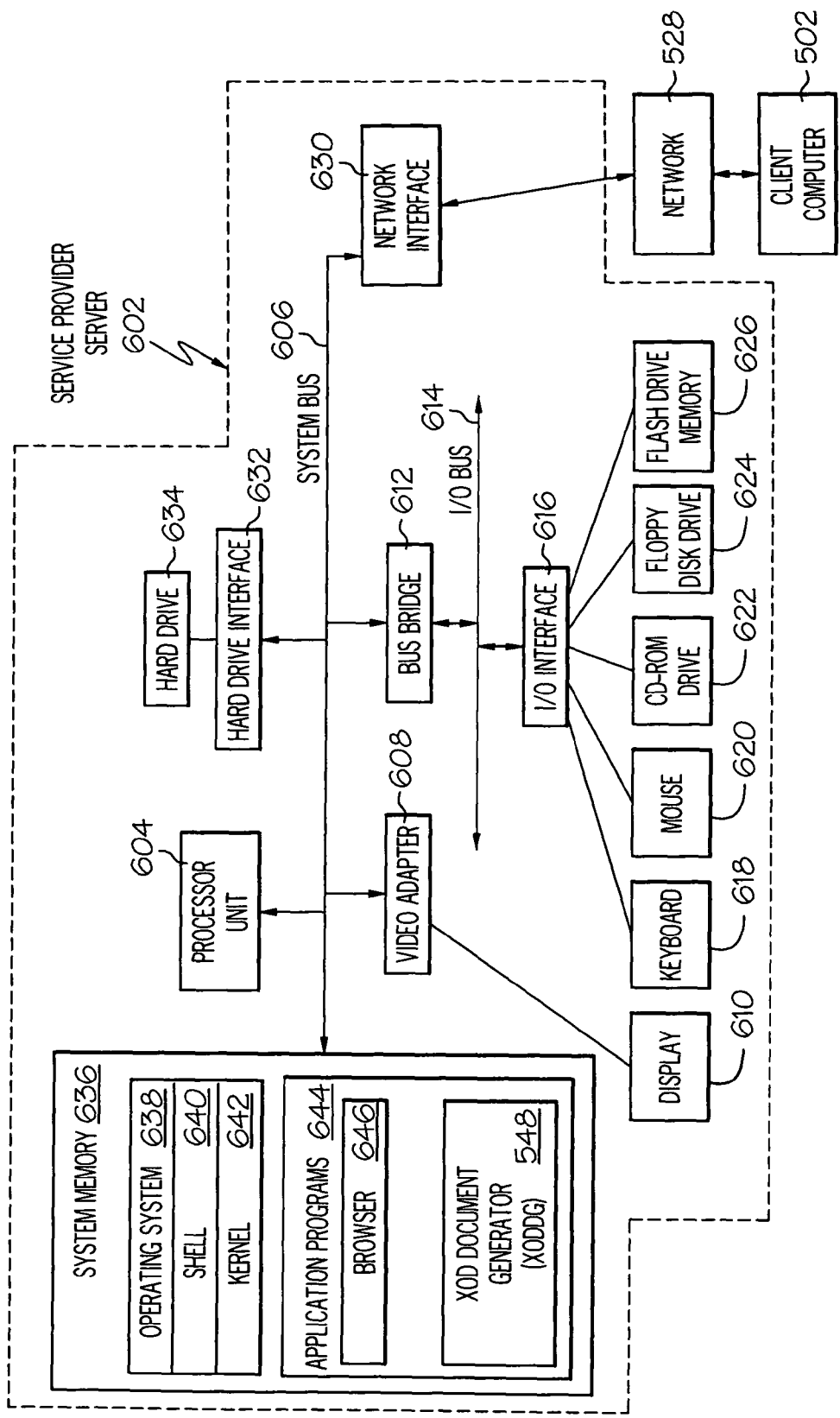
FIG. 6 depicts an exemplary server that can be used to deploy software to the client computer shown in FIG. 5 for creating the XOD order document.

As noted above, XODDG 548 can be downloaded to client computer 502 from service provider server 602, shown in exemplary form in FIG. 6. Service provider server 602 includes a processor unit 604 that is coupled to a system bus 606. A video adapter 608 is also coupled to system bus 606. Video adapter 608 drives/supports a display 610. System bus 606 is coupled via a bus bridge 612 to an Input/Output (I/O) bus 614. An I/O interface 616 is coupled to I/O bus 614. I/O interface 616 affords communication with various I/O devices, including a keyboard 618, a mouse 620, a Compact Disk—Read Only Memory (CD-ROM) drive 622, a floppy disk drive 624, and a flash drive memory 626. The format of the ports connected to I/O interface 616 may be any known to those skilled in the art of computer architecture, including but not limited to Universal Serial Bus (USB) ports.

Service provider server 602 is able to communicate with client computer 502 via network 528 using a network interface 630, which is coupled to system bus 606.

System bus 606 is also coupled to a hard drive interface 632, which interfaces with a hard drive 634. In a preferred embodiment, hard drive 634 populates a system memory 636, which is also coupled to system bus 606. Data that populates system memory 636 includes service provider server 602's operating system 638, which includes a shell 640 and a kernel 642. Shell 640 is incorporated in a higher level operating system layer and utilized for providing transparent user access to resources such as application programs 644, which include a browser 646, and a copy of XODDG 548 described above, which can be deployed to client computer 502.

The hardware elements depicted in service provider server 602 are not intended to be exhaustive, but rather are representative to highlight essential components required by the present invention. For instance, service provider server 602 may include alternate memory storage devices such as flash drives, magnetic cassettes, Digital Versatile Disks (DVDs), Bernoulli cartridges, and the like. These and other variations are intended to be within the spirit and scope of the present invention.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 7A:
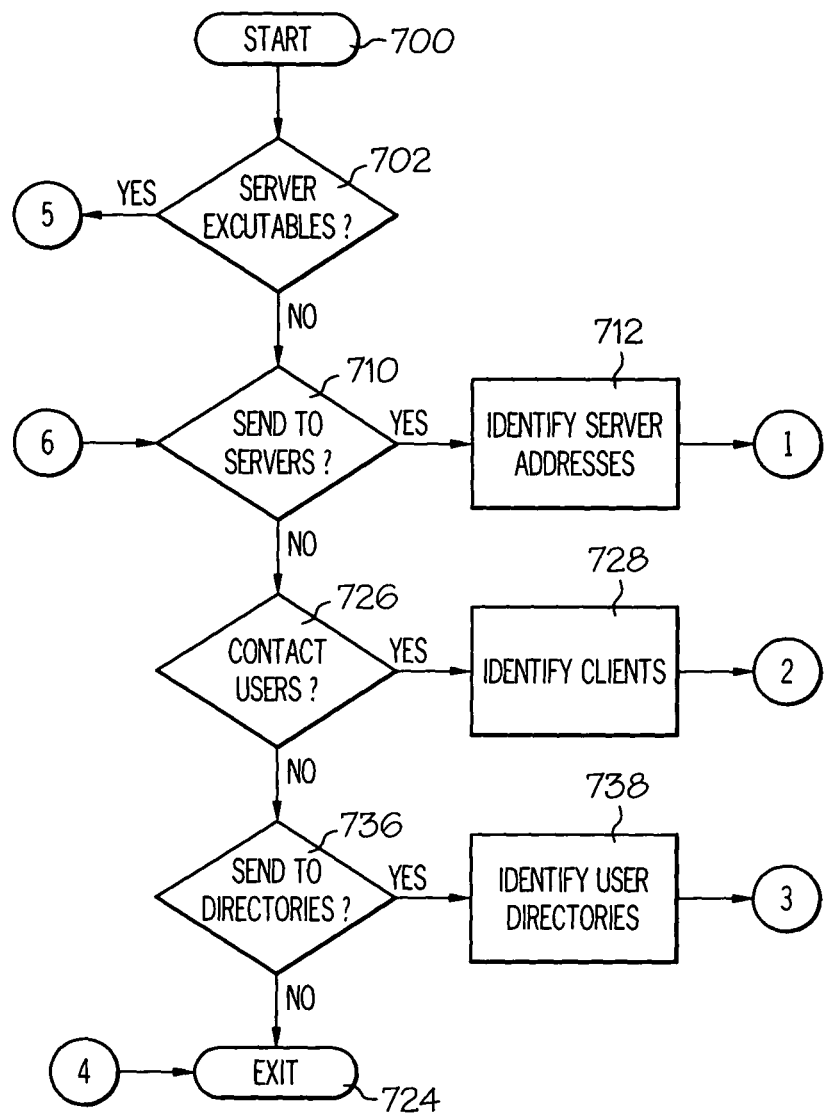
FIGS. 7a-b show a flow-chart of steps taken to deploy software capable of executing the steps and elements shown in FIGS. 1-4.
Figure 7B:
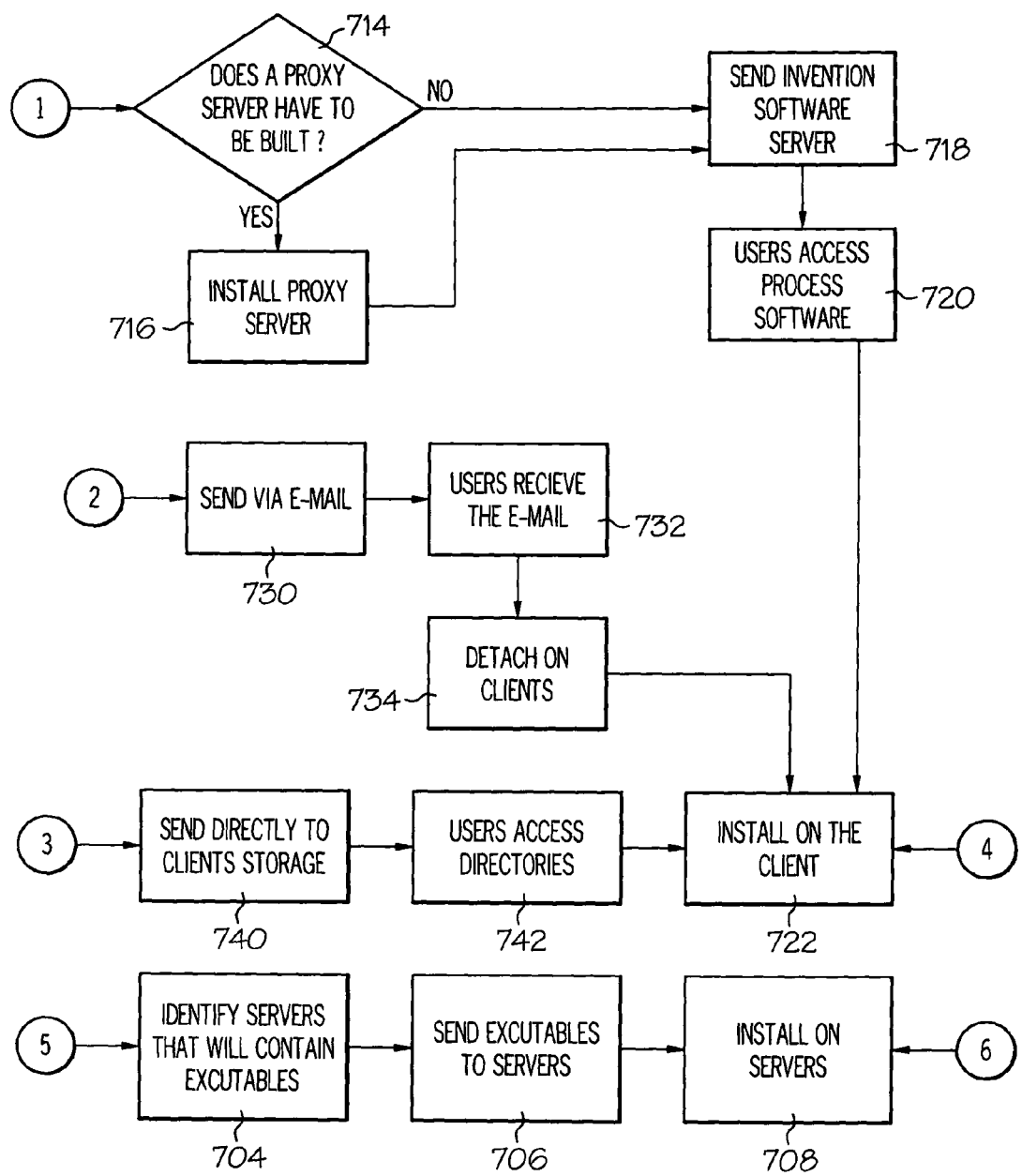

Thus, the method described herein, and in particular as shown in FIGS. 1-6, can be deployed as a process software from TPA server 602 to client computer 502. Referring now to FIG. 7, step 700 begins the deployment of the process software. The first thing is to determine if there are any programs that will reside on a server or servers when the process software is executed (query block 702). If this is the case, then the servers that will contain the executables are identified (block 704). The process software for the server or servers is transferred directly to the servers' storage via File Transfer Protocol (FTP) or some other protocol or by copying though the use of a shared file system (block 706). The process software is then installed on the servers (block 708).

Next, a determination is made on whether the process software is be deployed by having users access the process software on a server or servers (query block 710). If the users are to access the process software on servers, then the server addresses that will store the process software are identified (block 712).

A determination is made if a proxy server is to be built (query block 714) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 716). The process software is sent to the servers either via a protocol such as FTP or it is copied directly from the source files to the server files via file sharing (block 718). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 720). Another embodiment is to have the servers automatically copy the process software to each client and then run the installation program for the process software at each client computer. The user executes the program that installs the process software on his client computer (block 722) then exits the process (terminator block 724).

In query step 726, a determination is made whether the process software is to be deployed by sending the process software to users via e-mail. The set of users where the process software will be deployed are identified together with the addresses of the user client computers (block 728). The process software is sent via e-mail to each of the users' client computers (block 730). The users then receive the e-mail (block 732) and then detach the process software from the e-mail to a directory on their client computers (block 734). The user executes the program that installs the process software on his client computer (block 722) then exits the process (terminator block 724).

Lastly a determination is made on whether to the process software will be sent directly to user directories on their client computers (query block 736). If so, the user directories are identified (block 738). The process software is transferred directly to the user's client computer directory (block 740). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 742). The user executes the program that installs the process software on his client computer (block 722) and then exits the process (terminator block 724).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 8A:
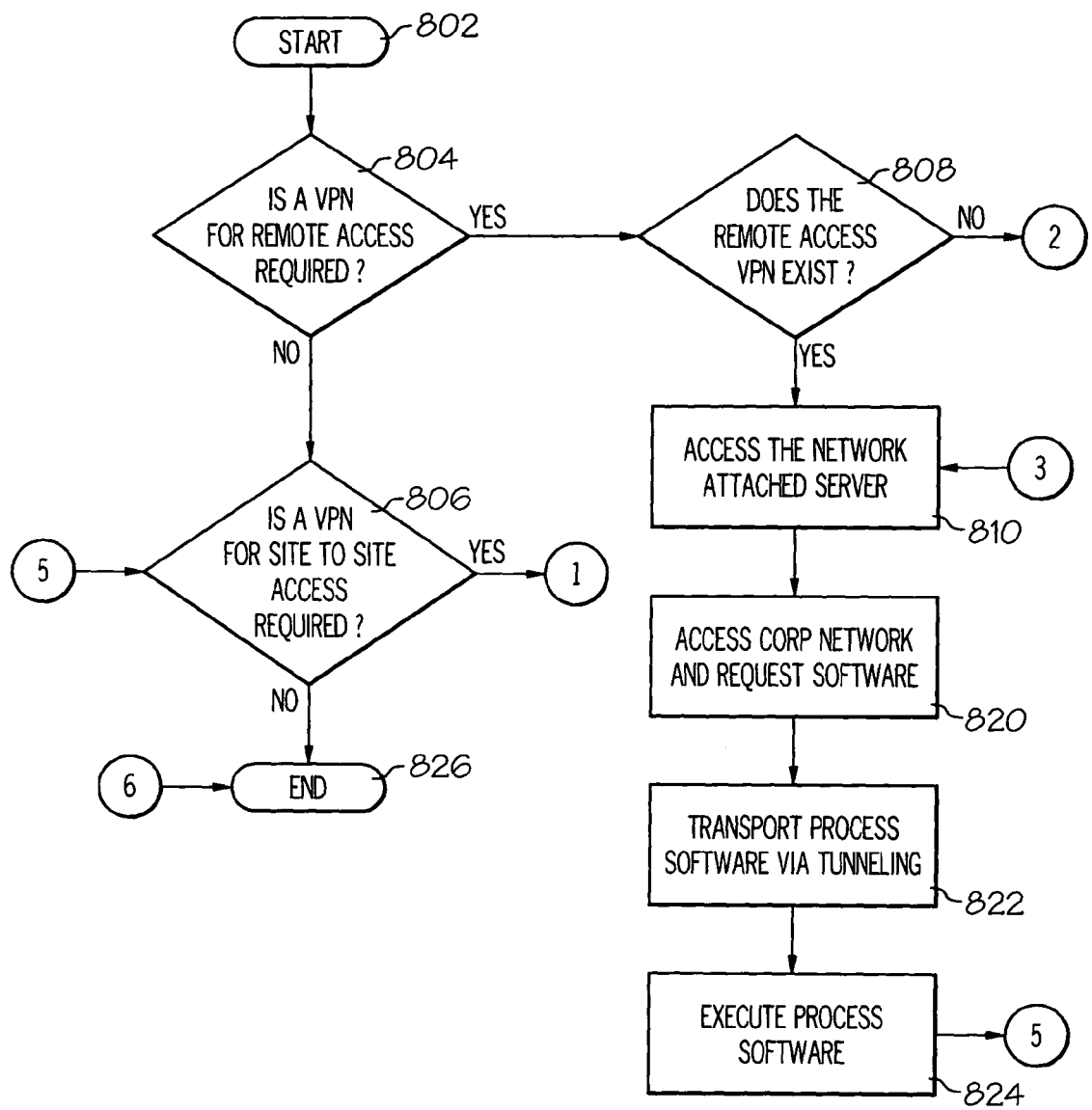
FIGS. 8a-c show a flow-chart of steps taken to deploy in a Virtual Private Network (VPN) software that is capable of executing the steps and elements shown in FIGS. 1-4.
Figure 8B:
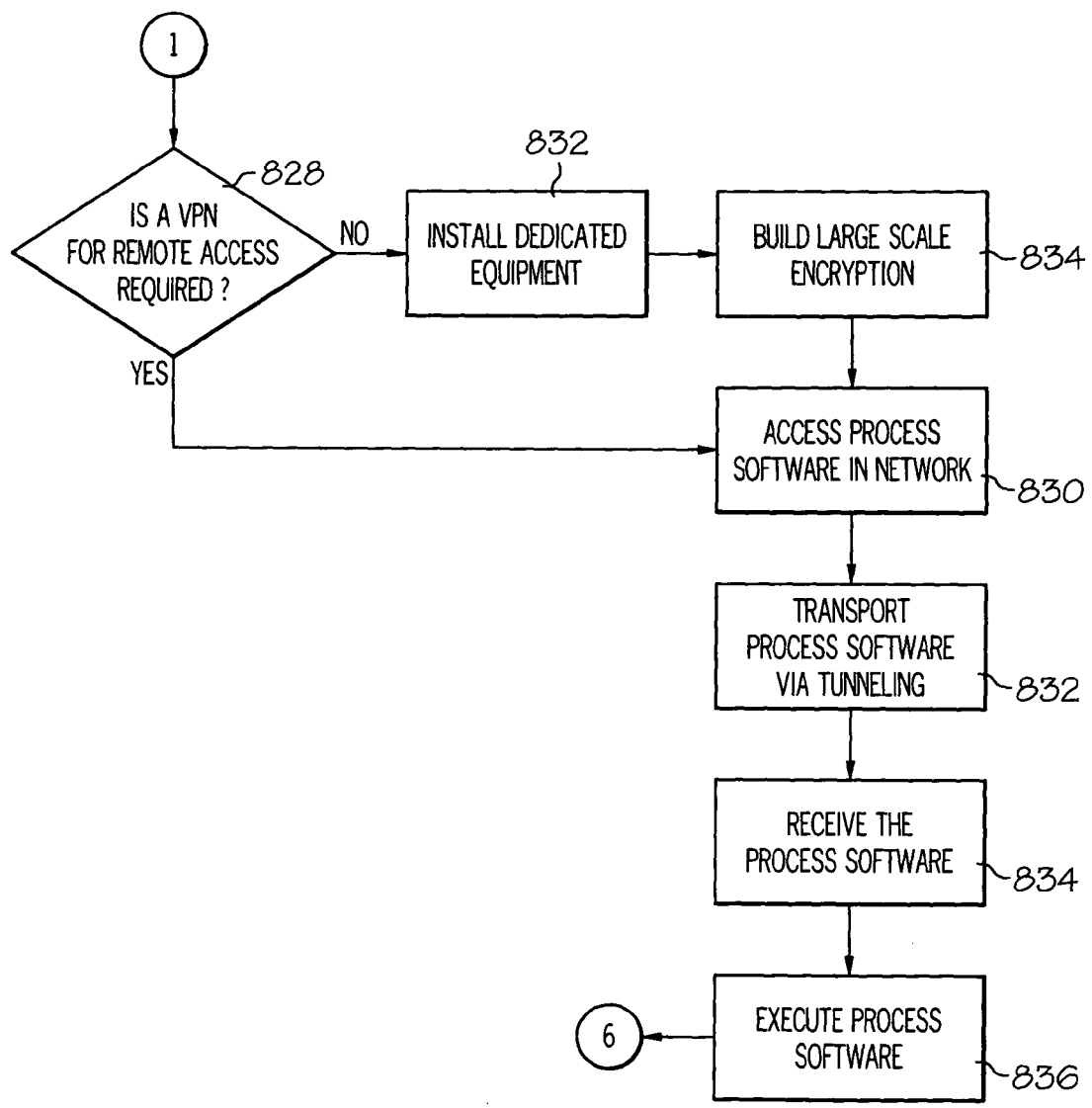
Figure 8C:
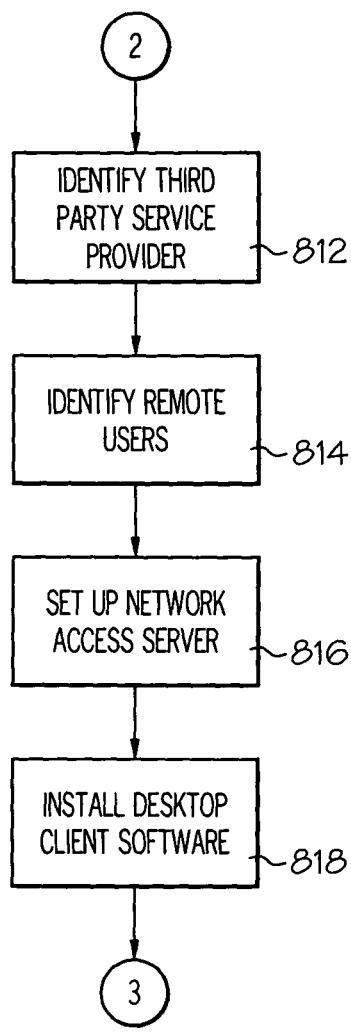

The process for such VPN deployment is described in FIG. 8. Initiator block 802 begins the Virtual Private Network (VPN) process. A determination is made to see if a VPN for remote access is required (query block 804). If it is not required, then proceed to (query block 806). If it is required, then determine if the remote access VPN exists (query block 808).

If a VPN does exist, then proceed to block 810. Otherwise identify a third party provider that will provide the secure, encrypted connections between the company's private network and the company's remote users (block 812). The company's remote users are identified (block 814). The third party provider then sets up a network access server (NAS) (block 816) that allows the remote users to dial a toll free number or attach directly via a broadband modem to access, download and install the desktop client software for the remote-access VPN (block 818).

After the remote access VPN has been built or if it been previously installed, the remote users can access the process software by dialing into the NAS or attaching directly via a cable or DSL modem into the NAS (block 810). This allows entry into the corporate network where the process software is accessed (block 820). The process software is transported to the remote user's desktop over the network via tunneling. That is the process software is divided into packets and each packet including the data and protocol is placed within another packet (block 822). When the process software arrives at the remote user's desk-top, it is removed from the packets, reconstituted and then is executed on the remote users desk-top (block 824).

A determination is then made to see if a VPN for site to site access is required (query block 806). If it is not required, then proceed to exit the process (terminator block 826). Otherwise, determine if the site to site VPN exists (query block 828). If it does exist, then proceed to block 830. Otherwise, install the dedicated equipment required to establish a site to site VPN (block 832). Then build the large scale encryption into the VPN (block 834).

After the site to site VPN has been built or if it had been previously established, the users access the process software via the VPN (block 830). The process software is transported to the site users over the network via tunneling (block 832). That is the process software is divided into packets and each packet including the data and protocol is placed within another packet (block 834). When the process software arrives at the remote user's desktop, it is removed from the packets, reconstituted and is executed on the site users desktop (block 836). The process then ends at terminator block 826.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9A:
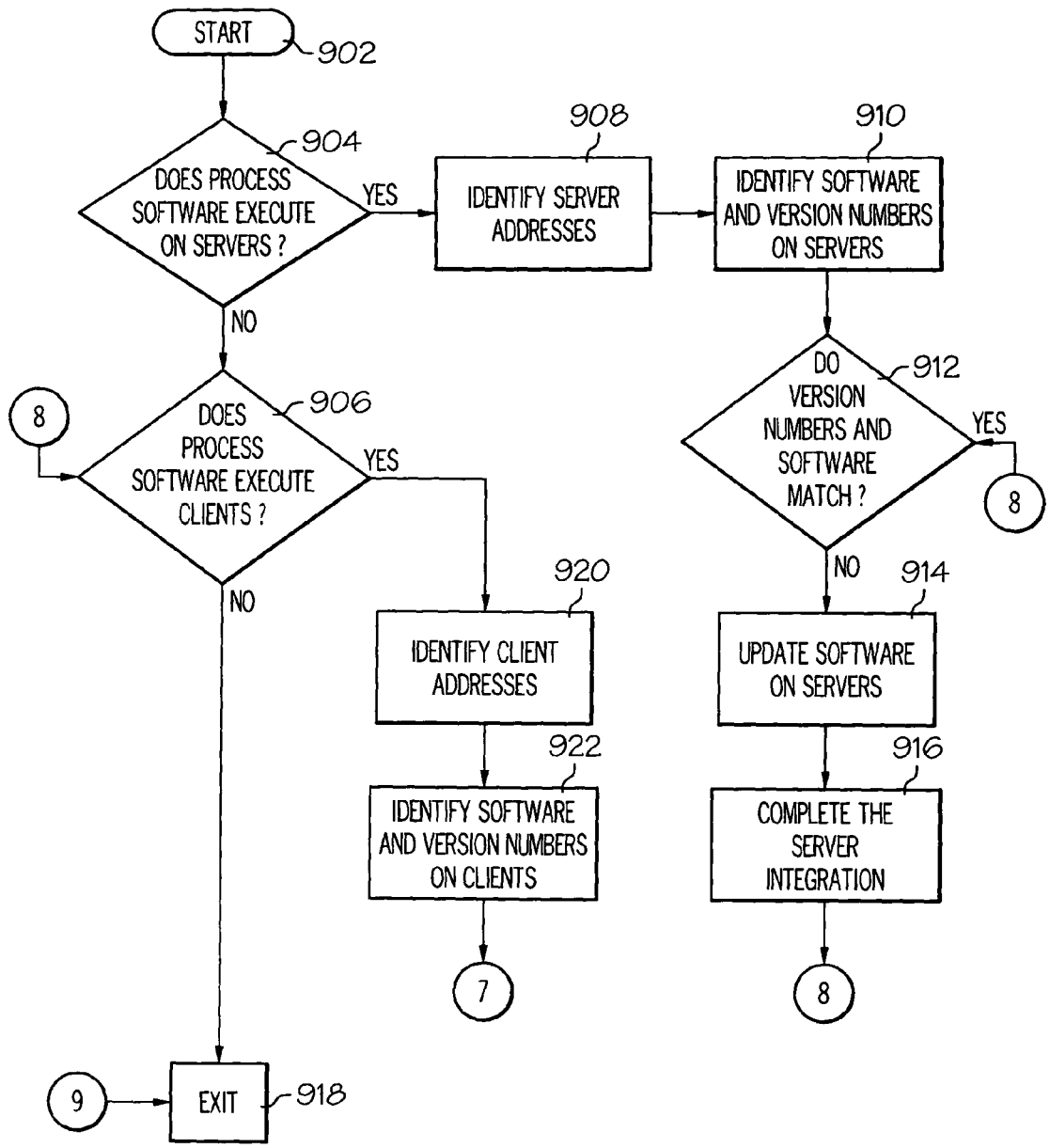
FIGS. 9a-b show a flow-chart showing steps taken to integrate into an computer system software that is capable of executing the steps and elements shown in FIGS. 1-4.
Figure 9B:
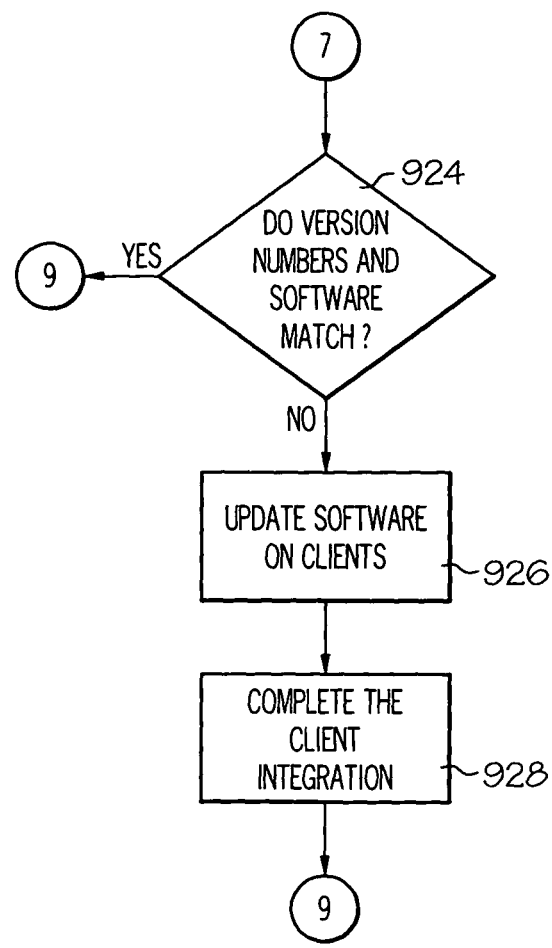

For a high-level description of this process, reference is now made to FIG. 9. Initiator block 902 begins the integration of the process software. The first tiling is to determine if there are any process software programs that will execute on a server or servers (block 904). If this is not the case, then integration proceeds to query block 906. If this is the case, then the server addresses are identified (block 908). The servers are checked to see if they contain software that includes the operating system (OS), applications, and network operating systems (NOS), together with their version numbers, which have been tested with the process software (block 910). The servers are also checked to determine if there is any missing software that is required by the process software in block 910.

A determination is made if the version numbers match the version numbers of OS, applications and NOS that have been tested with the process software (block 912). If all of the versions match and there is no missing required software the integration continues in query block 906.

If one or more of the version numbers do not match, then the unmatched versions are updated on the server or servers with the correct versions (block 914). Additionally, if there is missing required software, then it is updated on the server or servers in the step shown in block 914. The server integration is completed by installing the process software (block 916).

The step shown in query block 906, which follows either the steps shown in block 904, 912 or 916 determines if there are any programs of the process software that will execute on the clients. If no process software programs execute on the clients the integration proceeds to terminator block 918 and exits. If this not the case, then the client addresses are identified as shown in block 920.

The clients are checked to see if they contain software that includes the operating system (OS), applications, and network operating systems (NOS), together with their version numbers, which have been tested with the process software (block 922). The clients are also checked to determine if there is any missing software that is required by the process software in the step described by block 922.

A determination is made is the version numbers match the version numbers of OS, applications and NOS that have been tested with the process software (query block 924). If all of the versions match and there is no missing required software, then the integration proceeds to terminator block 918 and exits.

If one or more of the version numbers do not match, then the unmatched versions are updated on the clients with the correct versions (block 926). In addition, if there is missing required software then it is updated on the clients (also block 926). The client integration is completed by installing the process software on the clients (block 928). The integration proceeds to terminator block 918 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10A:
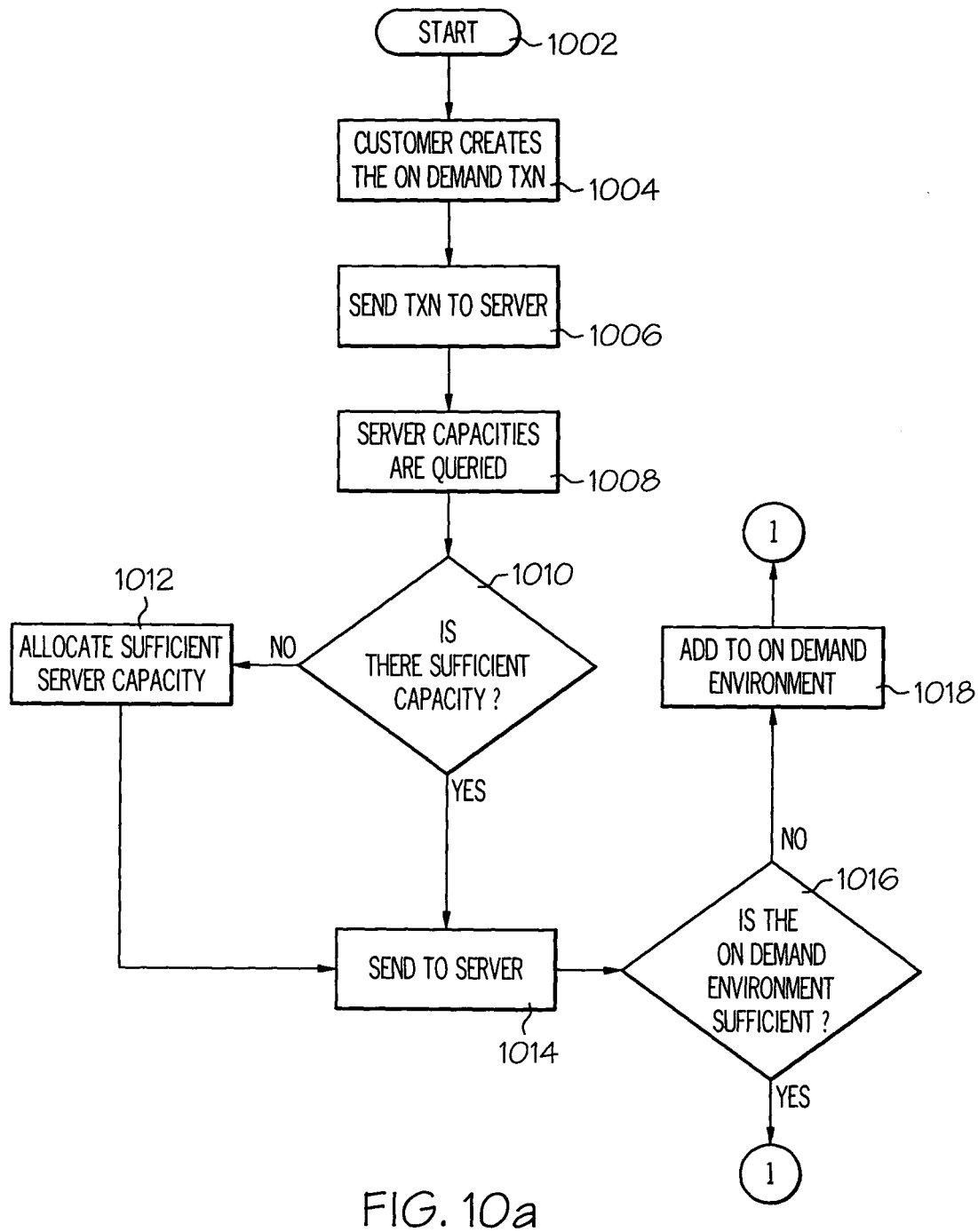
FIGS. 10a-b show a flow-chart showing steps taken to execute the steps and elements shown in FIGS. 1-4 using an on-demand service provider.
Figure 10B:
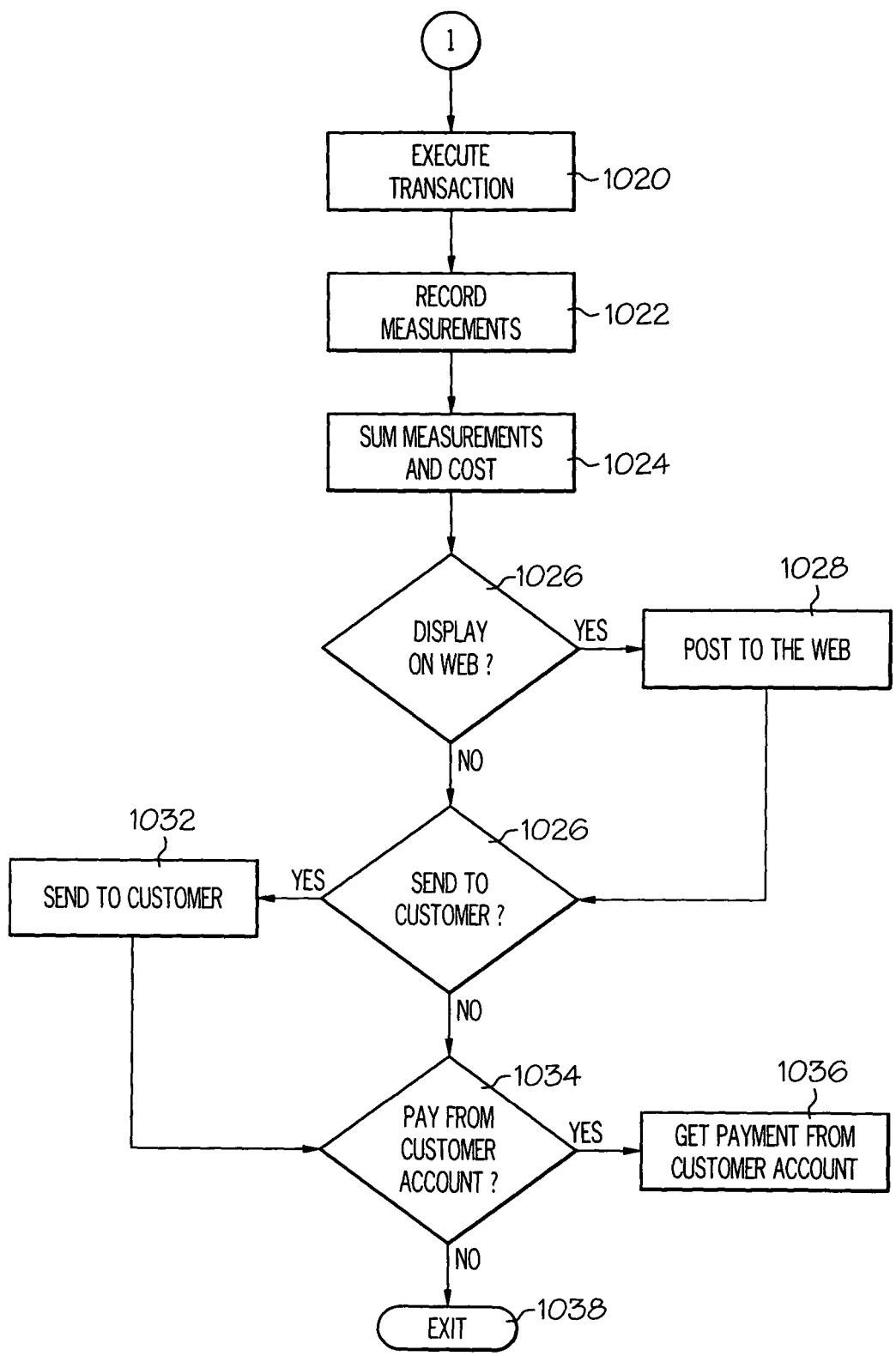

With reference now to FIG. 10, initiator block 1002 begins the On Demand process. A transaction is created than contains the unique customer identification, the requested service type and any service parameters that further, specify the type of service (block 1004). The transaction is then sent to the main server (block 1006). In an On Demand environment the main server can initially be the only server, then as capacity is consumed other servers are added to the On Demand environment.

The server central processing unit-(CPU) capacities in the On Demand environment are queried (block 1008). The CPU requirement of the transaction is estimated, then the servers available CPU capacity in the On Demand environment are compared to the transaction CPU requirement to see if there is sufficient CPU available capacity in any server to process the transaction (query block 1010). If there is not sufficient server CPU available capacity, then additional server CPU capacity is allocated to process the transaction (block 1012). If there was already sufficient Available CPU capacity then the transaction is sent to a selected server (block 1014).

Before executing the transaction, a check is made of the remaining On Demand environment to determine if the environment has sufficient available capacity for processing the transaction. This environment capacity consists of such things as but not limited to network bandwidth, processor memory, storage etc. (block 1016). If there is not sufficient available capacity, then capacity will be added to the On Demand environment (block 1018). Next the required software to process the transaction is accessed, loaded into memory, then the transaction is executed (block 1020).

The usage measurements are recorded (block 1022). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1024).

If the customer has requested that the On Demand costs be posted to a web site (query block 1026), then they are posted (block 1028). If the customer has requested that the On Demand costs be sent via e-mail to a customer address (query block 1030), then these costs are sent to the customer (block 1032). If the customer has requested that the On Demand costs be paid directly from a customer account (query block 1034), then payment is received directly from the customer account (block 1036). The On Demand process is then exited at terminator block 1038.

The presented method and system thus provide the ability to capture special bid requirements dynamically using a WEB-based configurator. The method and system allow a sales configurator to create more complex configurations according to product/customer requirements. Information is encapsulated in a dynamic structure rather than one based on fixed definition part numbers, feature codes, or model definitions. This offers increased flexibility in the customer offering and eliminates the set up time required if the offering must be converted to a fixed definition orderable element. A "Building-Block enabled" manufacturing process can respond appropriately to each requirement in an automated fashion, thus reducing set up time. The method and process can be deployed in an "On-Demand" fashion as described above, making a supply chain more responsive to a customer's needs.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
   creating an object collection of objects that describe features of components of a product;
   creating a view database that describes a logical relationship among components in the object collection;
   generating a single document having non-intertwined entities representing the object collection and the view database; and
   updating the single document according to technical requirements for a product being manufactured according to a product description created from the single document.

2. The computer-implementable method of claim 1, wherein the view database shows hierarchies according to different parameters of the product.

3. The computer-implementable method of claim 2, wherein the product is a computer system.

4. The computer-implementable method of claim 3, wherein one of the different parameters of the product is a Logical Partitioning (LPAR) of the computer system.

5. The computer-implementable method of claim 3, wherein one of the different parameters of the product is a physical orientation of components in the computer system.

6. The computer-implementable method of claim 1, wherein the single document is an eXtensible Order Data (XOD) document that is described in an Extensible Markup Language (XML) schema.

7. The computer-implementable method of claim 1, further comprising:
   manufacturing the product according to the product description from the single document.

8. A system comprising:
   a processor;
   a data bus coupled to the processor;
   a memory coupled to the data bus; and
   a computer-usable medium embodying computer program code, the computer program code comprising instructions executable by the processor and configured to:
     create an object collection of objects that describe features of components of a product;
     create a view database that describes a logical relationship among components in the object collection;
     generate a single document having non-intertwined entities representing the object collection and the view database; and
     update the single document according to technical requirements for a product being manufactured according to a product description created from the single document.

9. The system of claim 8, wherein the view database shows hierarchies according to different parameters of the product.

10. The system of claim 9, wherein the product is a computer system.

11. The system of claim 10, wherein one of the different parameters of the product is a Logical Partitioning (LPAR) of the computer system.

12. The system of claim 10, wherein one of the different parameters of the product is a physical orientation of components in the computer system.

13. The system of claim 8, wherein the single document is an eXtensible Order Data (XOD) document that is described in an Extensible Markup Language (XML) schema.

14. The system of claim 13, further comprising:
   means for manufacturing the product according to the product description from the single document.

15. A computer-usable storage device embodying computer program code, the computer program code comprising computer executable instructions configured to:
   create an object collection of objects that describe features of components of a product;
   create a view database that describes a logical relationship among components in the object collection;
   generate a single document having non-intertwined entities representing the object collection and the view database;
   update the single document according to technical requirements for a product being manufactured according to a product description created from the single document; and manufacture the product according to the product description from the single document.

16. The computer-useable storage device of claim 15, wherein the view database shows hierarchies according to different parameters of the product.

17. The computer-useable storage device of claim 16, wherein the product is a computer system.

18. The computer-usable storage device of claim 15, wherein one of the different parameters of the product is a Logical Partitioning (LPAR) of the computer system.

19. The computer-useable storage device of claim 15, wherein the computer executable instructions are deployable to a client computer from a server at a remote location.

20. The computer-useable storage device of claim 15, wherein the computer executable instructions are provided by a service provider to a customer on an on-demand basis.

* * * * *